(12) United States Patent
Steinert et al.

(10) Patent No.: US 9,989,028 B2
(45) Date of Patent: Jun. 5, 2018

(54) METHOD FOR PRODUCING A PRESSURE LIMITING VALVE, PRESSURE LIMITING VALVE, AND COMPONENT FOR A FUEL INJECTION SYSTEM

(71) Applicant: Continental Automotive GmbH, Hannover (DE)

(72) Inventors: Ulf Steinert, Maxhuette-Haidof (DE); Hans-Joerg Koch, Brennberg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days. days.

(21) Appl. No.: 15/108,898

(22) PCT Filed: Apr. 28, 2015

(86) PCT No.: PCT/EP2015/059254
§ 371 (c)(1),
(2) Date: Jun. 29, 2016

(87) PCT Pub. No.: WO2015/173013
PCT Pub. Date: Nov. 19, 2015

(65) Prior Publication Data
US 2017/0175694 A1    Jun. 22, 2017

(30) Foreign Application Priority Data
May 12, 2014    (DE) .......................... 10 2014 208 891

(51) Int. Cl.
*F02M 59/48*    (2006.01)
*F16K 17/04*    (2006.01)
(Continued)

(52) U.S. Cl.
CPC ............ *F02M 59/48* (2013.01); *F02M 59/46* (2013.01); *F02M 61/20* (2013.01);
(Continued)

(58) Field of Classification Search
CPC ...... F02M 63/005; F02M 59/48; F02M 59/46; F02M 61/20; F16K 27/0245
(Continued)

(56) References Cited

U.S. PATENT DOCUMENTS 3,031,744 A * 5/1962 Stein .................. B23P 19/02
29/283
3,603,626 A * 9/1971 Whiteside ................ F16B 5/02
403/408.1
(Continued)

FOREIGN PATENT DOCUMENTS

DE          3422017 A1    5/1985   ............. F02M 59/46
DE    102011089797 A1    6/2013   ............. F02M 37/00
(Continued)

OTHER PUBLICATIONS

International Search Report and Written Opinion, Application No. PCT/EP2014/076389, 22 pages, dated Mar. 6, 2015.
(Continued)

*Primary Examiner* — Stephen K Cronin
*Assistant Examiner* — Kody Kight
(74) *Attorney, Agent, or Firm* — Slayden Grubert Beard PLLC

(57) ABSTRACT

A pressure limiting valve for a fuel injection system may include a sleeve, a fixing pin, a spring, a sealing element, and a seat. The sleeve may have a longitudinal axis. The fixing pin protruding through a cavity enclosed by the sleeve. The spring may have a first end supported on the sleeve and a second end supported by the sealing element. The seat may provide a sealing surface for the sealing element to block a fluid flow through the valve when closed position, and allow this flow to pass in other positions. The outer circumference of the sleeve may vary within predefined tolerances along the longitudinal axis. The fixing pin may be shaped to
(Continued)

plastically deform by a movement of the fixing pin along the longitudinal axis, in order to press the sleeve into the housing.

10 Claims, 1 Drawing Sheet

(51) Int. Cl.
    *F16K 27/02*     (2006.01)
    *F02M 63/00*     (2006.01)
    *F02M 59/46*     (2006.01)
    *F02M 61/20*     (2006.01)

(52) U.S. Cl.
    CPC ....... *F02M 63/005* (2013.01); *F16K 17/0406* (2013.01); *F16K 27/0245* (2013.01)

(58) Field of Classification Search
    USPC ............ 29/888.46, 888.42; 137/315, 315.17, 137/315.04
    See application file for complete search history.

(56) References Cited

U.S. PATENT DOCUMENTS

| | | | | | |
|---|---|---|---|---|---|
| 3,693,247 | A * | 9/1972 | Brown | ..................... | B21J 15/04 29/512 |
| 4,048,898 | A * | 9/1977 | Salter | ....................... | F16B 5/02 29/446 |
| 4,692,102 | A * | 9/1987 | Hafele | ................. | F02M 59/462 137/493.3 |
| 4,932,434 | A * | 6/1990 | Taylor | ..................... | F16K 17/06 137/469 |
| 5,042,888 | A * | 8/1991 | Shinjo | ................... | F16B 13/065 411/44 |
| 5,730,540 | A * | 3/1998 | Duran | ................... | F16B 5/0208 403/21 |
| 6,152,110 | A * | 11/2000 | Miyajima | .............. | F02M 59/46 123/457 |
| 6,356,614 | B1 * | 3/2002 | Allen | ................... | G21C 3/3305 376/434 |
| 7,926,319 | B2 * | 4/2011 | Johnson | ................. | B21D 39/20 29/523 |
| 8,272,856 | B2 * | 9/2012 | Fuchs | ................... | F02M 59/464 137/533.13 |
| 8,790,092 | B2 * | 7/2014 | Mueller | ................ | F04B 49/035 417/309 |
| 9,334,895 | B2 * | 5/2016 | Fabre | .................... | F16B 13/063 |
| 2002/0014221 | A1 * | 2/2002 | Mori | .................... | F02M 63/005 123/447 |
| 2007/0267063 | A1 * | 11/2007 | Davis | ...................... | B08B 3/026 137/115.11 |
| 2009/0116976 | A1 * | 5/2009 | Aritomi | ............. | F02M 63/0036 417/311 |
| 2009/0252621 | A1 * | 10/2009 | Siegel | ................ | F02M 63/0036 417/307 |
| 2011/0284092 | A1 * | 11/2011 | Spencer | ............. | F16K 17/0426 137/14 |
| 2013/0000604 | A1 * | 1/2013 | Gerstner | ............. | F02M 63/027 123/456 |
| 2015/0167610 | A1 * | 6/2015 | Fujita | ................... | F02M 65/001 239/584 |

FOREIGN PATENT DOCUMENTS

| | | | | |
|---|---|---|---|---|
| DE | 102012214048 A1 | | 2/2014 | ............ F02M 37/00 |
| EP | 0383075 A1 | * | 8/1990 | ........... F16B 59/462 |
| GB | 1216682 A | | 12/1970 | ............. F02M 59/00 |
| GB | 2202595 A | | 9/1988 | ............. F02M 59/46 |
| GB | 2263738 A | * | 8/1993 | .......... F02M 59/462 |
| JP | 4996990 B2 | | 8/2012 | |
| WO | 2015/173013 A1 | | 11/2015 | ............. F02M 59/46 |

OTHER PUBLICATIONS

German Office Action, Application No. 102014208891.7, 12 pages, dated Apr. 14, 2015.
Chinese Office Action, Application No. 201580001386.0, 12 pages, dated Apr. 28, 2017.
Korean Notice of Allowance, Application No. 2018003953779, 3 pages.

* cited by examiner

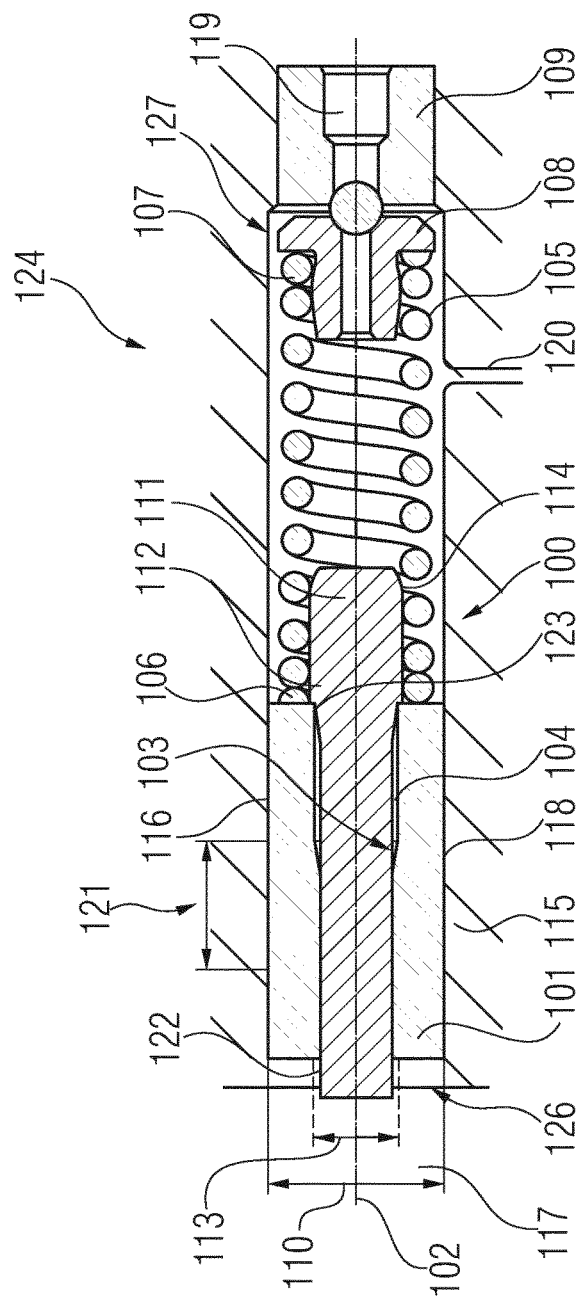

METHOD FOR PRODUCING A PRESSURE LIMITING VALVE, PRESSURE LIMITING VALVE, AND COMPONENT FOR A FUEL INJECTION SYSTEM

CROSS-REFERENCE TO RELATED APPLICATIONS

This application is a U.S. National Stage Application of International Application No. PCT/EP2015/059254 filed Apr. 28, 2015, which designates the United States of America, and claims priority to DE Application No. 10 2014 208 891.7 filed May 12, 2014, the contents of which are hereby incorporated by reference in their entirety.

TECHNICAL FIELD

The present disclosure is related to valves. More specifically, it relates to a pressure limiting valve for a fuel injection system, in particular for a fuel injection system of a motor vehicle. The disclosure further relates to a fuel injection system which includes a pressure limiting valve and a method for producing pressure limiting valves.

BACKGROUND

Injection systems for internal combustion engines of motor vehicles conventionally include pressure limiting valves. The pressure limiting valves may be integrated into high-pressure fuel pumps, for example, to protect the components from high fuel pressures in the event of thermal expansion or various malfunctions. For example, a pressure limiting valve in a petrol injection system may open at a fuel pressure of 250 bar. The pressure limiting valve may open communication between the high-pressure side and the low-pressure side.

To improve reliable operation of the injection system, very exacting requirements may be set for the accuracy of the opening pressure of the pressure limiting valve. In order to keep the tolerance range small, for example, a hydraulically measuring adjustment method may be used for adjusting the opening pressure. In this example, a spring force acting on the closing element of the pressure limiting valve is varied, conventionally by means of a rotational movement via a thread, for example, until the desired opening pressure is set. The production of two threads necessary for this purpose and the space for a separate seal involves a technical manufacturing outlay and takes up a corresponding amount of overall space.

In the fitted state, moreover, the pressure limiting valves must be sealed against pressures of up to 400 bar without sustaining measurable leakage.

SUMMARY

It is desirable to employ a method for producing a pressure limiting valve which affords a large adjustment range for the opening pressure. Moreover, it is desirable to provide a pressure limiting valve which affords a large adjustment range of the opening pressure. Furthermore, it is desirable to specify a component having such a pressure limiting valve for use in a fuel injection system.

According to some embodiments of the invention, a method for producing a pressure limiting valve for a fuel injection system consists in providing a housing having a locating bore, which has a diameter that remains constant within predefined tolerances along a longitudinal axis. A sealing element, a spring and a sleeve with a fixing pin are provided. The fixing pin protrudes through a cavity. The cavity is enclosed by the sleeve. The sealing element, the spring and the sleeve with the fixing pin are arranged in the locating bore so that the spring is supported by a first end on the sleeve and by a second end on the sealing element. The sleeve is moved relative to the housing along the longitudinal axis. The preload of the spring is thereby adjusted. The fixing pin is moved along the longitudinal axis relative to the sleeve and thereby plastically deforms the sleeve, in order to press the sleeve into the housing, when a value of the preload of the spring corresponds to a predefined value of the opening pressure for the pressure limiting valve.

The sleeve is only displaced axially inside the locating bore. The sleeve does not need to rotate relative to the housing. A large adjustment range for the opening pressure of the pressure limiting valve is therefore possible. In particular, the sleeve is displaceable by more than 1 mm along the longitudinal axis, in order to adjust the preload of the spring.

According to a further aspect of the invention, a pressure limiting valve for a fuel injection system comprises a sleeve along a longitudinal axis. The pressure limiting valve comprises a fixing pin, which protrudes through a cavity. The cavity is enclosed by the sleeve. A spring is supported by a first end on the sleeve and by an opposite, second end on a sealing element. The pressure limiting valve comprises a seat in order to block a fluid flow through the pressure limiting valve in a closed position, in which the sealing element is in contact with the seat, and to allow this flow to pass in other positions. The sleeve has an outer circumference, which in a first state is constant within predefined tolerances along the longitudinal axis. The fixing pin is shaped so that the sleeve can be plastically deformed by a movement of the fixing pin along the longitudinal axis, in order to press the sleeve into a housing.

The first state corresponds, in particular, to an original state, in which the sleeve has not yet been pressed into the housing. The outer circumference of the sleeve does not have any steps, threads or the like. Fluctuations of the outer circumference only occur, for example, due to manufacturing tolerances. To improve the grip of the pressed sleeve in the housing, the sleeve according to embodiments has texturing such as scoring or the like. The outer circumference is then the largest outer circumference of the texturing. In particular, the outer circumference fluctuates by no more than 0.5 mm within the predefined tolerance.

Since the valve sleeve is pressed into the housing by the plastic deformation, no screwed connection is needed between the sleeve and housing. The sleeve can therefore be fitted easily and rapidly in the housing. Moreover, it is possible to produce the valve sleeve cost-effectively. The valve sleeve is produced by deep-drawing, for example. Without the housing the movement of the fixing pin relative to the sleeve would result in an expansion of the outer circumference. The fixing pin presses the sleeve outwards and in so doing deforms it compared to the shape in the first state.

According to embodiments, the fixing pin protrudes beyond the sleeve in the direction of the sealing element, in order to form a guide for the spring. The fixing pin secures the spring radially both during assembly of the pressure limiting valve and during operation.

According to embodiments, the fixing pin, at one end facing the sealing element, comprises a projecting area, which serves for plastic deformation of the sleeve. The fixing pin has a shape which varies in diameter along the longitudinal axis. In the first state the area with the smaller diameter is arranged inside the cavity. For pressing purposes, the pin is moved relative to the sleeve, so that the projecting area is drawn into the cavity. The sleeve is thereby plastically deformed.

According to embodiments, the sleeve encloses the cavity in such a manner that the cavity has a larger diameter at the end facing the sealing element than at the end remote from the sealing element. A contact free of any play with the smaller diameter of the fixing pin is therefore achieved also at the end remote from the sealing element. Furthermore, a reliable pressing is also possible.

According to further embodiments, the fixing pin has a texturing, in order to achieve a fluid-tight connection to the sleeve. The fixing pin has biting edges or the like on the projecting area, for example, in order to remain securely connected to the sleeve after pressing, even over a prolonged service life of the pressure limiting valve. The leak-tightness of the pressure limiting valve at the sleeve is therefore also assured.

According to a further aspect of the invention, a component for a fuel injection system comprises a pressure limiting valve according to the application. The component moreover comprises the housing with a locating bore. The sleeve, the spring and the sealing element are arranged in the locating bore. The locating bore has a diameter that remains constant within predefined tolerances along the longitudinal axis. For example, the component is a high-pressure pump, in particular a reciprocating pump, for delivering fuel. According to further embodiments the component is a fuel collecting line or a further element of the fuel injection system.

According to further embodiments, the component comprises the housing with the locating bore, which has the diameter that remains constant within predefined tolerances along the longitudinal axis. The sleeve, however, has an outer circumference which varies along the longitudinal axis. However, the outer circumference of the sleeve varies within predefined limits, just sufficiently to allow secure pressing of the sleeve in the locating bore. The remaining elements of the pressure limiting valve on the other hand remain unchanged.

Fixing the sleeve by means of plastic deformation affords a simple coupling between the sleeve and the housing. The sleeve can be fitted in the housing easily and rapidly. Furthermore, it is possible to fix the sleeve to the housing in various positions relative to the housing. The opening pressure of the pressure limiting valve is set by the various positions of the sleeve. A substantially constant diameter of the locating bore along the longitudinal axis allows a large adjustment range for the opening pressure. The movement of the sleeve relative to the housing is no longer limited by a graduated step between two different diameters of the locating bore. Moreover, a separate seal, such as an O-ring, for example, is not needed for sealing between the housing and the sleeve. The number of components is therefore reduced. In addition, it is possible to reduce the overall size of the component. The diameter of the locating bore can be reduced compared to conventional locating bores for a screw thread. With a constant wall thickness around the locating bore it is therefore possible to reduce the overall size. This leads, on the one hand, to a reduced weight of the component and hence, in particular, to a reduction of the exhaust gases during operation of the internal combustion engine that is supplied with fuel by the fuel injection system. On the other hand, the system pressures can be increased, since with constant outside dimensions of the pump larger wall thickness are feasible.

According to embodiments, the sleeve is in direct contact with housing over the entire outer circumference. The sleeve does not have any projections or indentations in which the sleeve is separated by a distance from the housing. The O-ring, for example, is conventionally provided in such an indentation. The fluid-tight connection between the sleeve and the housing is achieved by the pressing.

BRIEF DESCRIPTION OF THE DRAWINGS

Further advantages, features and developments are set forth in the following examples, explained in conjunction with the FIG. 1.

FIG. 1 is a drawing showing a component having a pressure limiting valve according to various embodiments of the present disclosure.

DETAILED DESCRIPTION

FIG. 1 shows a component 124 which may be used in a fuel injection system, according to various embodiments of the present disclosure. The component 124 may include a high-pressure pump, for example, in particular a reciprocating pump. The high-pressure pump may be adapted to deliver a particular fluid, for example petrol or diesel fuel, from a fluid tank to a pressure accumulator (also referred to as a common rail). In the case of petrol, system pressures of 150 bar or more, for example 250 bar or up to 350 bar or more, prevail in the fuel injection system. From the pressure accumulator the fluid is injected by means of injection valves into combustion chambers of the internal combustion engine in order to propel the motor vehicle.

As shown, a pressure limiting valve 100 is arranged in the component 124. The pressure limiting valve 100 comprises a sleeve 101. The sleeve 101 extends along a longitudinal axis 102.

A fixing pin 103 is arranged inside the sleeve 101. The elongated fixing pin 103 extends along the longitudinal axis 102. The fixing pin 103 is, in particular, longer than the sleeve 101, so that it projects beyond the sleeve 101 on both sides. A projecting area 112 of the fixing pin 103 is thereby formed on the inward facing side and a contact area 122 on the outward facing side. The fixing 103 pin protrudes through a cavity 104 of the sleeve 101. The cavity 104 extends along the longitudinal axis 102 through the sleeve 101.

In some embodiments, a spring 105 is supported by a first end 106 on the sleeve 101. Spring 105 may be, in some embodiments, a spiral spring. With its second end 107 the spring is supported on a sealing element 108. The spring is adapted to press the sealing element 108 against a seat 109. A fluid inlet 119 is provided on the seat 109.

In operation, the fluid and the pressure bear on the fluid inlet 119. In the closed state, when the sealing element 108 is in contact with seat 109, a fluid flow from the fluid inlet 119 into the pressure limiting valve 100 is blocked. If the pressure in the fluid inlet 119 exceeds the opening pressure of the pressure limiting valve 100, which is substantially predetermined by the spring 105, the sealing element 108 lifts off from the seat 109. A fluid flow is therefore allowed to pass from the fluid inlet 119 to a fluid outlet 120. The pressure limiting valve 100, for example, has an opening pressure so that the system pressure on the side of the fluid inlet 119 is 150 bar or more, for example, in particular 250 bar to 350 bar.

The component 124 comprises a housing 115. For example, the housing 115 is the pump housing of the high-pressure pump. A locating bore 116 is introduced into the housing 115. From an outside 126 of the housing 115 to an area 127, the locating bore has a substantially constant diameter 117. The area 127 is, in particular, the area in which the sealing element 108 is arranged and which adjoins the seat 109. The locating bore 116 extends from the outside 126 along the longitudinal axis 102.

The diameter 117 fluctuates due to manufacturing tolerances. In particular, the locating bore 116 has a diameter 117, which may be formed without any stepping as a result of different drill sizes. For example, a single drill may be used to introduce the locating bore 116 into the housing 115. For example, from the outside 126 to the area 127, the diameter 117 of the locating bore 116 may have a diameter of 5 mm, giving a fluctuation of less than 1%. The fluctuations in the diameter 117 due to tolerances are, in some embodiments, less than 1 mm.

The sleeve 101 has an outer circumference 110. The outer circumference 110 corresponds to the diameter 117. The outer circumference 110 of the sleeve 101 is substantially constant along the longitudinal axis 102. In some embodiments, only manufacturing tolerances and/or texturing to improve the sealing are present on the outer circumference 110. In a first state, in which the sleeve 101 is not yet connected to the housing 115, the sleeve 101 can be pushed into the locating bore 116 and is displaceable in the locating bore 116 relative to the housing 115. Inside the housing 115 the sleeve is pressed against the spring 105 until a predefined preload of the spring 105 is reached. For this purpose, the sleeve 101 can be displaced inside the housing 115 along the adjustment range 121 axially to the longitudinal axis 102. No rotation is needed in order to screw the sleeve in. The adjustment range 121 is, in particular, longer than 1 mm, for example longer than 1.5 mm.

On reaching the position of the sleeve 101 relative to the housing 115 at which the spring 105 has the predefined preload, the sleeve 101 is pressed into the housing 115. To do this, the fixing pin 103 is drawn outwards along the longitudinal axis 102. The fixing pin 103 is shaped so that its movement outwards plastically deforms the sleeve 101, at least in portions. The sleeve 101 is thereby pressed into the housing 115 in a fluid-tight manner. Further sealing elements can therefore be dispensed with. Only a one-piece sleeve is needed for fluid-tight coupling of the sleeve to the housing 115. In the pressed state the sleeve 101 and the housing 115 have a contact area 118. In particular, the contact area 118 extends along the longitudinal axis 102 over the entire outer circumference 110 of the sleeve 101. At the outer circumference 110 no free space is provided between the sleeve 101 and the housing 105.

For pressing the sleeve 101 into the housing 115, the fixing pin 103 comprises the projecting area 112 at its end 111 facing the sealing element 108. According to embodiments the projecting area 112 has a texturing 114. A beveled flank 123 is provided between the projecting area 112 and the shaft of the fixing pin 103, which has a diameter smaller than the projecting area 112. In the unpressed first state the beveled flank 123 is, in particular, in contact with the sleeve 101. For the pressing, a tool on the contact area 122 grips the pin and draws the projecting area 112 into the cavity 104. The beveled flank 123 here facilitates the relative movement between the fixing pin 103 and the sleeve 101. A diameter 113 of the cavity 104 and the diameter of the projecting area 112 are matched to one another so that introducing the projecting area 112 into the cavity 104 affords the plastic deformation for pressing in the sleeve.

Even after fixing the sleeve 101 in the housing 115, the fixing pin 103 protrudes beyond the sleeve 101 in the direction of the sealing element 108. In operation, the protruding area functions as a spring guide 125 for radially securing the spring 105. The projecting area 105 is introduced into the sleeve 101 so that the contact area between the sleeve 101 and the fixing pin 103 is fluid-tight. The texturing 114 on the projecting area 112 improves the fluid-tight connection.

By using the sleeve 101 with the constant outer circumference 110 and the housing 115 with the locating bore 116, which has the constant diameter 117, it is possible to increase the adjustment range 121 compared to conventional, stepped locating bores. Instead of an adjusting screw and a sealing element, just one single component, the sleeve 101, is now provided. The constant diameter 117 makes it possible to reduce the overall size of the pump compared to pumps having a sealing diameter greater than the thread diameter.

The invention claimed is:

1. A method for producing a pressure limiting valve for a fuel injection system, the method comprising:
   providing a housing having a locating bore, which has a diameter that remains constant within predefined tolerances along a longitudinal axis,
   providing a sealing element, a spring and a sleeve with a fixing pin, which protrudes such that the non-threaded outer surface of the fixing pin facing an inner surface of the sleeve, and the inner surface of the sleeve facing the outer surface of the fixing pin, are non-threaded to thereby define a screwless engagement between the fixing pin and the sleeve,
   arranging the sealing element, the spring and the sleeve with the fixing pin in the locating bore, so that the spring is supported by a first end on the sleeve and by a second end on the sealing element,
   moving the sleeve relative to the housing along the longitudinal axis and thereby adjusting the preload of the spring,
   pulling the fixing pin longitudinally along the longitudinal axis relative to the sleeve in a direction away from the sealing element, such that the non-treaded outer surface of the fixing pin translates longitudinally along the non-threaded inner surface of the sleeve via a screwless engagement and thereby plastically deforms the sleeve in a radially outward direction, in order to press the sleeve into the housing, when a value of the preload of the spring corresponds to a predefined value of the opening pressure for the pressure limiting valve.

2. The method according to claim 1, in which the sleeve is displaceable by more than one millimeter along the longitudinal axis, in order to adjust the preload.

3. A pressure limiting valve for a fuel injection system, comprising
   a sleeve having a longitudinal axis,
   a fixing pin protruding through a cavity, which is enclosed by the sleeve, wherein an outer surface of the fixing pin facing an inner surface of the sleeve, and the inner surface of the sleeve facing the outer surface of the fixing pin, are non-threaded to thereby define a screwless engagement between the fixing pin and the sleeve;
   a spring supported by a first end on the sleeve,
   a sealing element supporting a second end of the spring, a seat, in order to block a fluid flow through the pressure limiting valve in a closed position, in which the sealing element is in contact with the seat, and to allow this flow to pass in other positions, wherein the sleeve has an outer circumference, which in a first state is within predefined tolerances along the longitudinal axis, the fixing pin shaped to plastically deform by a movement of the fixing pin along the such that the non-threaded outer surface of the fixing pin surface of the fixing pin translates longitudinally along the non-threaded inner surface of the sleeve via the screwless engagement, in order to press the sleeve into the housing.

4. The pressure limiting valve according to claim 3, in which the fixing pin protrudes beyond the sleeve in the direction of the sealing element, in order to form a guide for the spring.

5. The pressure limiting valve according to claim 3, in which the fixing pin, at one end facing the sealing element, comprises a projecting area, which serves for plastic deformation of the sleeve.

6. The pressure limiting valve according to claim 3, in which the sleeve encloses the cavity in such a manner that the cavity has a larger diameter at the end facing the sealing element than at the end remote from the sealing element.

7. The pressure limiting valve according to claim 3, in which the fixing pin has a texturing in order to achieve a fluid-tight connection to the sleeve.

8. The component according to claim 3, wherein the sleeve in the first state is displaceable relative to the housing, in order to set a preload of the spring to a predefined value.

9. The component according to claim 3, in which the sleeve is in direct contact with housing over the entire outer circumference.

10. A valve for limiting pressure differential, the valve comprising:

a sleeve defining a longitudinal axis and having an outer circumference defined transverse to the longitudinal axes;

a pin protruding through a cavity enclosed by the sleeve, wherein an outer surface of the pin facing an inner surface of the sleeve, and the inner surface of the sleeve facing the outer surface of the pin, are non-threaded to thereby define a screwless engagement between the pin and the sleeve;

a sealing element;

a spring compressed between the sleeve and the sealing element; and a seat providing a sealing surface for the sealing element to block a fluid flow through the valve when in a closed position and to allow the flow to pass in other positions, wherein the outer circumference of the sleeve in a first state varies within predefined tolerances and the pin plastically deforms the sleeve into a second state as the pin moves along the longitudinal axis relative to the sleeve via the screwless engagement between the pin and the sleeve, in order to press the sleeve into the housing.

\* \* \* \* \*